Patented Mar. 25, 1941

2,236,147

UNITED STATES PATENT OFFICE 2,236,147

PROCESS FOR PLUGGING FORMATIONS

William Bruce Lerch, Clyde H. Mathis, and Eugene J. Gatchell, Bartlesville, Okla., assignors to Phillips Petroleum Company, a corporation of Delaware No Drawing. Application May 19, 1938, Serial No. 208,933

1 Claim. (Cl. 166—21)

This invention relates to a product and process for plugging or sealing openings or voids in tanks, walls, earthen ponds, pits, and/or underground formations encountered in drilling oil or gas wells.

The invention more particularly relates to the use of a liquid material comprising a modified sodium silicate which by neutralizing, mixing or associating with acids or salts will form a gel material which solidifies when in place to prevent the flow of water, oil, and/or gas from or into the formations into which the modified sodium silicate material has been injected, and generally serve as a sealing agent against flow into or out of tanks, walls, dams, earthen ponds, pits, and/or from or through any surface whatsoever.

In the drilling of oil and gas wells, water formations are usually encountered during drilling and before the productive oil or gas horizon is contacted. It is required to run steel casing into the well to shut off these water formations but in many instances these waters are corrosive and in contacting the steel casing will soon corrode the same, allowing the encroachment of water into the well. Also after an oil or gas well is completed, bottom hole water may be entering the well bore from the producing formation in which case this water must be stopped if the well is to be operated profitably. This water must be produced from the well bore along with the oil or gas and materially raises the lifting costs to get the oil to the surface of the ground as it cuts down the amount of oil which can be produced and further raises the treating cost of the oil when it arrives on the surface of the ground since the water must be removed from the oil before it can be processed.

The primary object of this invention is to introduce a liquid gel forming material into or on the formation or surface desired to be plugged in such manner that a gel by neutralization, mixing or association will be formed.

A further object of this invention is to provide a gel forming liquid which may be used to plug off underground formations in drilling wells and producing wells. In drilling wells, this material may be used to plug off a water producing formation so that drilling may be continued without setting a string of pipe; unprofitable oil producing formations may also be plugged by the material and in producing wells water and gas may be shut off by this process.

A still further object of the invention is to provide a plugging agent which has the advantage of remaining liquid until in place and the setting time may be varied or controlled from a few minutes to several days.

Other objects and advantages will appear to those skilled in the art from a careful study of the description to follow.

The most desirable gel is formed from 41° Baumé sodium silicate diluted in from 1 to 3 parts water and an equal volume of hydrochloric acid which gives the best setting time for the particular dilution of sodium silicate. The diluted sodium silicate is poured into an equal volume of the neutralizing agent with enough agitation to prevent precipitation. This gel does not precipitate in the presence of brine as does alkaline silicates. Other acids form the same type of gel, but hydrochloric is usually the most inexpensive and available acid in oil field districts.

Sodium silicate has heretofore been employed as a sealing or plugging agent to shut off gas or water bearing formations in the drilling or producing of oil wells. The trouble experienced in the use of sodium silicate was the fact that the sodium silicate would set up solid in the presence of the salts normally present in the brine encountered in wells. This did not allow sufficient time to get the sodium silicate into the formation to be plugged before it set and hence made the product practically worthless as a plugging agent. Applicants have found that the setting or solidifying action of the sodium silicate can be delayed by the addition of acid or salts and has made use of this knowledge in using the resulting product to seal formations in wells where brine is present. It is found that the acid and salts retard or delay the action of the salts in the brine on the sodium silicate gel material to the point where the material can be pressured into the formation to be sealed before the same sets up as a gel or solid mass.

Other examples of mixtures which may be used will follow:

A gel applicable to plugging formations can be made from 1 part "N" brand sodium silicate diluted with 1 part water and mixed with an equal volume of 7° Baumé hydrochloric acid. The diluted sodium silicate is poured into the acid with sufficient stirring to prevent precipitation. The mixture becomes too viscous to pump within three hours at room temperature. This mixture has a viscosity compared to water of 1.14 when first mixed, 1.33 after one hour and 1.69 after two hours.

A gel applicable to plugging formations can be made by diluting "N" brand sodium silicate with 2 parts of water and mixing with an equal volume of 4° hydrochloric acid. The sodium silicate is poured into the acid with constant stirring as previously described. At room temperature the mixture remains liquid over night; at 125° F. the solution remains liquid for over three hours and at 190° F. the set is within one hour.

A gel wherein "N" brand sodium silicate is diluted with 1 part water and added to an equal volume of a 50% solution of sodium bisulfate. With this mixture the time required to gel at room temperature is from 10 to 12 hours.

Another gel applicable is where "N" brand sodium silicate is diluted with 1 part water and added with stirring to an equal volume of a mixture of 3½ parts 18° hydrochloric acid and 19 parts of a sodium bisulfate solution (50 parts sodium hydroxide to 100 parts water). This liquid mixture gels within four hours and is not precipitated by oil field brines.

Still another gel applicable is where "N" brand sodium silicate is diluted with one part water and poured into an equal volume of 2% sodium aluminate. The time required for the resulting liquid material to gel is 10 to 12 hours.

The application of the material to the well bore may be directly through the casing, tubing, bailer or any conventional method suitable for lowering the liquid into the well. If necessary, pressure may be applied through the tubing by positive pump action after a wall packer has been set between the tubing and casing above the formation where treatment is desired. After sufficient gel forming material has been added to the formation, a plug of suitable material may be used to separate the gel forming material from the oil or water which will follow in the tubing to drive the gel forming material out into the formation to be plugged and thus insure that the gel forming material will not set up in the tubing. The pressure will be held on the formation until the liquid material has had plenty of time to form a solid impermeable mass, plugging the formation.

The setting time of the sodium silicate gel may be varied to fit the particular application, the governing factors being: the depth or extent of the formation, the permeability, porosity and chemical nature of the formation and the available method of application. The setting time is best controlled by the quantity of acid or salt present in the mixture.

In conclusion, our invention specifically relates to the use of liquid gel forming materials with the chemical reaction definitely controlled so as to produce a solid gel within a controlled time limit so as to allow sufficient time to prepare and introduce the liquid gel forming material into a well, tank or any surface to be treated, before the same resinifies or solidifies. Certain chemical mixtures of materials which will react in this manner have been specifically mentioned but it is to be understood that other compounds or mixtures containing the same physical and chemical properties as those specifically mentioned will react in the same manner as those mentioned and that various changes in the choice and amounts of materials used can be made without departing from the spirit of our invention or the scope of the subjoined claim.

We claim:

A method of plugging formations in wells which comprises the step of introducing into the formation to be plugged a liquid gel forming material comprising a mixture of 1 part sodium silicate diluted with 1 part water associated with an equal volume of a mixture of 3½ parts hydrochloric acid and 19 parts of a sodium bisulfate solution and allowing the mixture to solidify when in place to form a solid mass.

WILLIAM BRUCE LERCH.
CLYDE H. MATHIS.
EUGENE J. GATCHELL.